July 25, 1933.  R. H. HELSEL  1,919,651
CLUTCH
Original Filed May 4, 1926  2 Sheets-Sheet 1

WITNESS:

INVENTOR
Reuben H. Helsel
BY
ATTORNEYS.

July 25, 1933.  R. H. HELSEL  1,919,651
CLUTCH
Original Filed May 4, 1926  2 Sheets-Sheet 2

WITNESS:

INVENTOR
Reuber H. Helsel
BY
ATTORNEYS.

Patented July 25, 1933

1,919,651

UNITED STATES PATENT OFFICE

REUBEN H. HELSEL, OF LONG ISLAND CITY, NEW YORK, ASSIGNOR TO GENERAL REGISTER CORPORATION, OF BROOKLYN, NEW YORK, A CORPORATION OF PENNSYLVANIA

CLUTCH

Original application filed May 4, 1926, Serial No. 106,632. Divided and this application filed November 12, 1930. Serial No. 495,026.

This invention relates to an improved clutch and associated means and particularly to an arrangement for stopping a shaft in a predetermined position after a defined cycle of operation.

This application is a division of my prior application Serial No. 106,632, filed May 4, 1926, entitled "Check punching and issuing machine" which application has matured into Patent No. 1,797,771 granted Mar. 24, 1931.

In my said prior application there is illustrated the improved clutch mechanism in combination with a check issuing machine, the mechanism of which is designed to operate through a predetermined cycle upon the depression of one of a series of keys. It will be obvious that the improved clutch mechanism may be applied to any other machines in which certain operating parts must have predetermined cycles of operation and come to rest in predetermined positions and remain inoperative until certain instrumentalities are manually, or otherwise, actuated.

It is the broad object of the present invention to provide a single and positive clutch mechanism of the type indicated above. It is a more specific object of the invention to provide a mechanism of this type which is also adapted to control a prime mover to render the same inoperative at the end of a predetermined cycle of operation.

Other objects of the invention relating particularly to details of construction will be apparent from the following description read in conjunction with the accompanying drawings in which.

Figure 1:
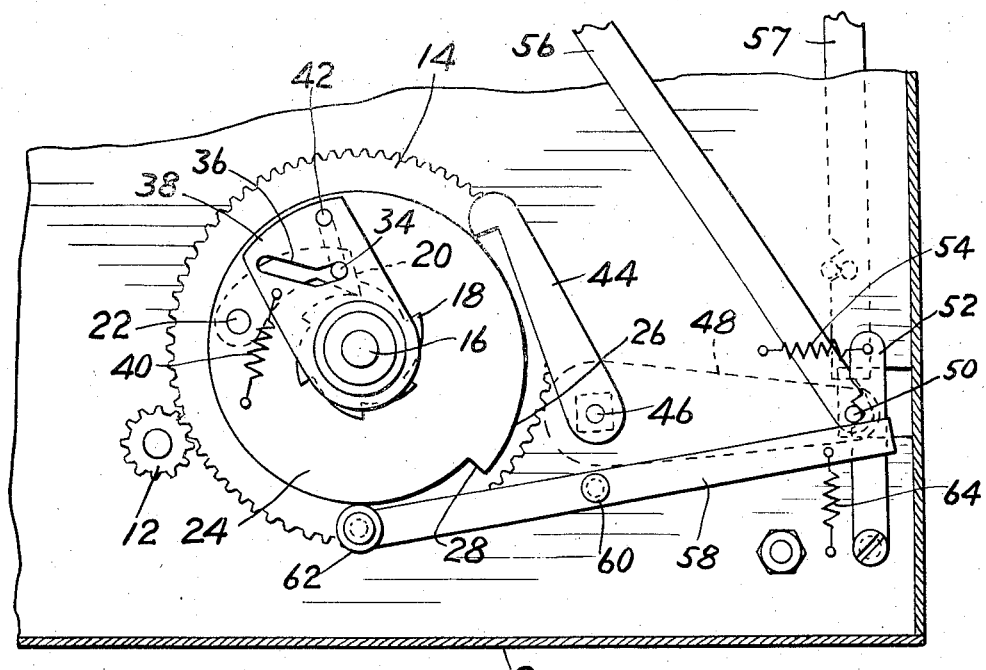
Figure 1 is a vertical section through a machine embodying the improved clutch mechanism showing the main operating parts in side elevation.
Figure 2:
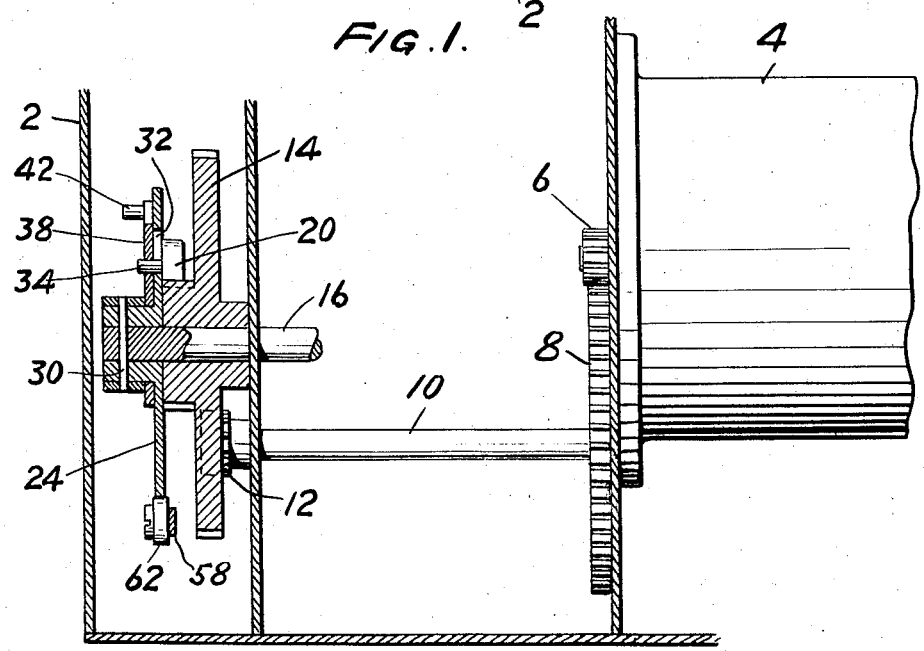
Figure 2 is a transverse vertical section of the machine partially taken through the axes of the rotating parts of the clutch.

In the following description the various elements forming the clutch proper and the associated motor driving mechanism are illustrated in conjunction with certain parts of the check issuing machine, which is fully described in the application referred to above. Only so much of this check issuing mechanism is illustrated as is necessary to show elements which operate in conjunction with the clutch to control its actions.

The frame of the machine which is illustrated in 2 has any suitable form consisting in the present instance of upright plates forming bearings for certain shafts hereafter described and also providing a support for various elements. A motor 4 mounted on the frame has secured to its shaft a pinion 6 which, through the medium of an intermediate gear 8, a shaft 10 and a pinion 12, drives the gear 14 which is journalled on the power transmitting shaft 16 so as to rotate freely about the same.

The gear 14 is provided with a hub carrying teeth 18 which are arranged to engage a pawl 20 pivoted at 22 to a plate 24, the hub of which is pinned to the shaft 16 as indicated at 30. The plate 24 is provided with a cam edge 26 having an abrupt shoulder 28 formed therein.

A slot 32 in the plate 24 permits the passage of a pin 34 carried by the pawl 20 to the opposite side of the plate where it engages within a cam slot 36 formed in a member 38 loosely mounted on the hub of the plate 24 so as to be freely rotatable relatively thereto. A spring 40 normally urges the member 38 in a counterclockwise direction as viewed in Figure 1 relatively to the plate so that the pin 34 will normally be located in the inner end of the slot 36, thus throwing the pawl 20 into position to be engaged by one of the teeth 18. The spring 40 is secured to the member 38 and to the plate 24.

A pin 42 carried by the member 38 is adapted to engage a hook lever 44 carried by a shaft 46 transversely journalled in the frame 2. The shaft 46 has secured thereto for rotation therewith arms 48, the outer ends of which carry a transverse rod 50, the ends of which project through suitable openings in the upright plates of the frame. The pin 50 is adapted to be engaged in either of two notches formed in each of two members 52 which are drawn against the pin 50 by springs 54 connected to their upper ends and to the frame. By reason of these notches the shaft 46 is yieldingly held in either of two positions, in one of which the hook 44 clears the path of the pin 42 and in the other of which the hook 44 is arranged to be engaged by the pin 42 at the end of a cycle of operation.

Pivoted to the pin 50 there is illustrated a link 56 which, in the complete machine, is connected to certain controlling parts. Since these parts affect only indirectly the operation of the clutch as applied to a specific mechanism, they are not illustrated in detail. These parts are merely examples of various auxiliary controls which may be used in conjunction with the clutch, as will be obvious.

There is also illustrated a controlling bar 57 which may be manually moved vertically in any suitable fashion, this bar being in the complete check issuing machine operated upon depression of any one of a series of selector keys. It is also illustrative of one means for manually controlling the clutch. Its lower end is positioned above the pin 50 so that upon depression, it will engage the pin and thus rotate the shaft 46 in a clockwise direction as viewed in Figure 1.

A lever 58 is pivoted to the frame at 60 and carries at one end a cam following roller 62 held in engagement with the periphery of the disc 24 by a spring 64 which is secured to the lever and to the frame.

Figure 3:
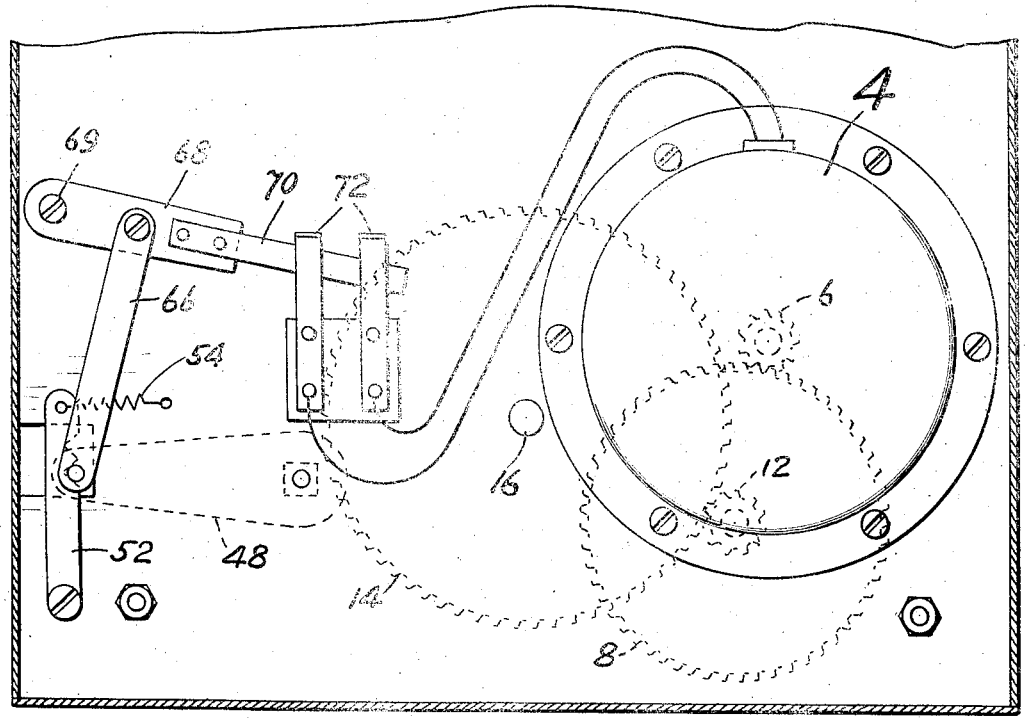
Figure 3 is a side elevation of the side of the machine opposite that illustrated in Figure 1.

Referring now to Figure 3, there are illustrated certain connections occurring on the side of the machine opposite that illustrated in Figure 1. These connections include a link 66 pivoted on the pin 50 and also connected to an arm 68 pivoted at 69 to the frame and carrying a switch blade 70 arranged to cooperate with suitable switch contacts 72 which are located in the driving circuit of the motor. The motor is arranged to be driven, when the circuit is closed, by electrical connection of contacts 72 by the knife 70 and is stopped by the opening of this same circuit.

From the above description the operation of the clutch will be obvious. In the various figures the parts are illustrated in the positions assumed during operation. Initially the shaft 46 is located so that the pin 50 rests within the upper notches in the arms 52. The hook 44 engages the pin 42 and at the same time the cam roller 62 lies behind the ledge 28. When this is true, the member 38 occupies a position relative to the disc 24 so that the spring 40 is stretched and pin 34 is in the outer end of the opening 36 so that the pawl 20 is located outwardly of the path of the teeth 18. At this time, also, the switch blade 70 is in open position.

If now the member 57 is depressed or the shaft 46 is rocked in a clockwise direction, as viewed in Figure 1, by any other means, the pin 50 moves downwardly so as to be engaged by the lower notches of the levers 52. Simultaneously with this movement the switch 70 closes to start the motor 4. As the hook lever 44 rocks outwardly pin 42 is released and therefore the spring 40 is free to move the member 38 relative to the disc 24 so that the pawl 20 is cammed inwardly in position to be engaged by one of the teeth 18. Since the motor is now operating the shaft 16 will be positively driven.

As the disc 24 approaches the end of its cycle of rotation, the roller 62 rides over the raised part of the cam surface 26 so that the lever 58 is rocked in a counter-clockwise direction thereby raising the pin 50 which is engaged by its outer end. The degree of rise is sufficient to carry the pin 50 into the upper notches of the levers 52 which thereafter yieldingly retain it. At the same time the switch 70 is opened and the hook lever 44 is moved to a position wherein it engages the pin 42 retarding the member 38 and thereby causing the pawl 20 to move outwardly from engagement with the teeth 18. The momentum of the parts is such, however, that the disc 24 will continue to rotate until the pin 34 engages the outer end of the slot 36 whereupon the hook 44 becomes effective to positively stop the rotation of the disc and the shaft 16. It may be pointed out that at this time the pawl 20 is free from the teeth 18 so that the motor and the parts driving the gear 14 may continue to rotate until they are frictionally brought to rest. At the time when positive arrest of disc 24 and pin 34 occurs by the hook 44, the roller 62 will have ridden over the ledge 28 dropping behind the same and thereby preventing reversed movement of the disc 24 under the action of the spring 40. The parts thus come to rest in the initial position above described, in which the pawl 20 is held out of the path of the teeth 18.

It is obvious that numerous changes may be made in details of construction without departing from the spirit of the invention as defined in the following claims.

What I claim and desire to protect by Letters Patent is:

1. A clutch mechanism including a rotatable driving member carrying an engaging element, a driven member, a movable pawl carried by the driven member, a controlling element movable relatively to the driven member in opposite directions, and operative in such relative movement to move the pawl into the path of the engaging element, yielding means normally urging the controlling element relatively to the driven member to move the pawl into the path of the engaging element, means for producing opposite relative movement of the controlling element and driven member to cause the pawl to move out of the path of the engaging element, and means operable when the last means is active for preventing relative movement of the controlling element and driven member under the action of the yielding means.

2. A clutch mechanism including a rotatable driving member carrying an engaging element, a driven member, a movable pawl carried by the driven member, a controlling element movable relatively to the driven member in opposite directions and operative in such relative movement to move the pawl into the path of the engaging element, yielding means normally urging the controlling element relatively to the driven member in the normal direction of rotation to move the pawl into the path of the engaging element, means for retarding the controlling element to cause the pawl to move out of the path of the engaging element, and means for preventing a retrograde movement of the driven member when the controlling element is retarded.

3. A clutch mechanism including a rotatable driving member carrying an engaging element, a driven member, a movable pawl carried by the driven member, a controlling element movable relatively to the driven member in opposite directions and operative in such relative movement to move the pawl into the path of the engaging element, yielding means normally urging the controlling element relatively to the driven member in the normal direction of rotation to move the pawl into the path of the engaging element, means for retarding the controlling element to cause the pawl to move out of the path of the engaging element, devices for rendering the last named means operative at the end of a cycle, and means for preventing a retrograde movement of the driven member when the cycle is completed.

4. In combination with a driving motor, a clutch mechanism including a rotatable driving member carrying an engaging element, a driven member, a movable pawl carried by the driven member, a controlling element movable relatively to the driven member in opposite directions and operative in such relative movement to move the pawl into the path of the engaging element, yielding means normally urging the controlling element relatively to the driven member to move the pawl into the path of the engaging element, means for producing opposite relative movement of the controlling element and driven member to cause the pawl to move out of the path of the engaging element, means operable when the last named means is effective for preventing relative movement of the controlling element and driven member under the action of the yielding means, and means for stopping the motor's operation simultaneously with the disengagement of the pawl.

REUBEN H. HELSEL.